(No Model.)
R. M. BASSETT & T. F. STEVENSON.
VULCANIZING RUBBER BELTS, PACKING, &c.
No. 362,597. Patented May 10, 1887.
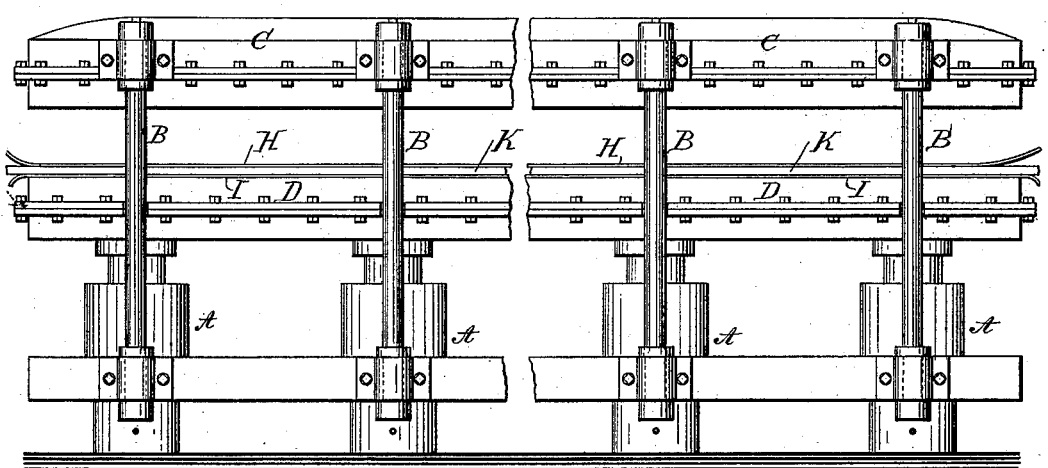
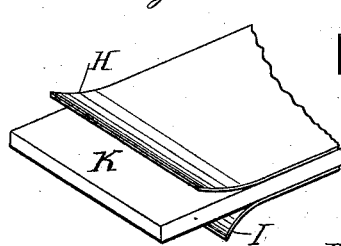
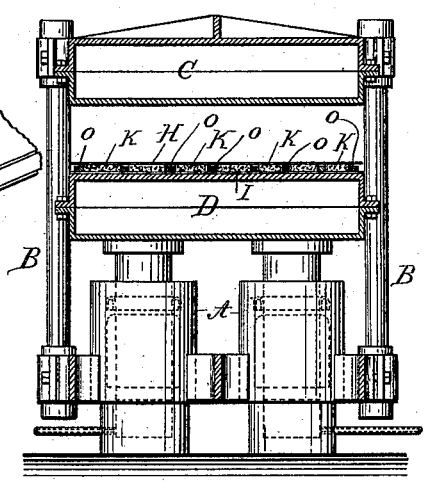
Witnesses:
J. Staib
Chas N. Smith
Inventors:
Royal M. Bassett
Thomas F. Stevenson
per Lemuel W. Serrell, Atty

UNITED STATES PATENT OFFICE.

ROYAL M. BASSETT, OF BIRMINGHAM, CONNECTICUT, AND THOMAS F. STEVENSON, OF BROOKLYN, NEW YORK.

VULCANIZING RUBBER BELTS, PACKING, &c.

SPECIFICATION forming part of Letters Patent No. 362,597, dated May 10, 1887.

Application filed January 25, 1884. Serial No. 118,664. (No model.)

*To all whom it may concern:*

Be it known that we, ROYAL M. BASSETT, of Birmingham, Connecticut, and THOMAS F. STEVENSON, of Brooklyn, New York, have invented an Improvement in Vulcanizing Rubber Belts, Packing, &c., of which the following is a specification.

Before our invention rubber belts and packing had been cured or vulcanized by heat while exposed to pressure between two plates or flat surfaces. In this condition the surface of the rubber is liable to imperfections resulting from the porous character of the cast-iron plates, and the said rubber is also liable to adhere to such surfaces, so that they require to be scraped and cleaned. In other instances rubber belts have been cured or vulcanized by being rolled up with an intervening layer or sheet of metal; but the belt is not uniformly heated and cured, and one surface of the belt is longer than the other in consequence of the convolution.

Our invention relates to the combination, with heated plates by which the rubber belt is exposed to the necessary pressure and vulcanizing-temperature, of intervening sheet-metal plates by which the surface of the rubber belt is rendered perfect and smooth, and opportunity is given for easily separating the metal and the rubber, and at the same time the rubber belt is kept perfectly flat while being acted upon. We usually employ with the said sheet-metal plates supporting-strips at the edges of the rubber belt, whereby such edges are kept straight and exposed to the same temperature and vulcanizing action as the other portions of the belt.

In the drawings, Figure 1 is a cross-section of the press and the belts ready to be compressed previous to the vulcanizing operation. Fig. 2 is a side elevation of the press. Fig. 3 represents the manner in which an endless belt is stretched while being vulcanized, and Fig. 4 is a perspective view showing the rubber and the metal sheets.

The hydraulic cylinder A, columns B, head-block C, and platen or follower D are of ordinary construction. It is usual to place two or more of these hydraulic cylinders in line with each other, so that the head-block and follower may be of sufficient length for curing the required amount of the rubber belt at each operation, and the head-block and follower are usually hollow for the introduction of steam under pressure for heating the same to the required temperature. These parts in themselves, being well known, do not form any special feature of our invention. The sheet-metal plates for the rubber belt are shown at H and I, one of said plates being above the rubber belt K and the other below the same. These metal plates will usually be of zinc or tinned iron, copper, or brass, and comparatively thin. They may be of sufficient length to receive the entire belt by successive stages during the vulcanizing operation, or they may be only of the same length as the hydraulic press. In either instance the metal plates for the rubber belt form smooth and flat surfaces, to which the india-rubber will not become affixed during the vulcanizing operation, and the surfaces of the belt will be smooth and uniform after the vulcanizing has been performed.

We sometimes apply upon or between the metallic sheets an edge strip or bar. (Shown at O.) These edge strips or bars are to be of the same thickness as the rubber belt when cured, and they are to be laid between the belts, as represented in Fig. 1, so that the edge strips or bars come at the edges of the rubber belts, so that the belts will be forced to assume a straight position while being cured or vulcanized.

If the india-rubber belt is endless, one portion of the belt will be above the other, and so passed through the press as to admit of the belt being moved along progressively during the vulcanizing operation. In this case the two portions of the endless belt will be cured simultaneously, and we introduce a plate of sheet metal, L, between the two portions of the belt, the plates of sheet metal H and I always being provided above and below both portions of the belt which are exposed to the action of the heat in the curing operation. It is to be understood that, after one portion of the belt has been cured by the exposure to the action of heat and pressure for a proper length of time, the pressure is to be removed, the parts of the press separated, and the rubber belt moved endwise, so as to bring another portion thereof into position for the pressure to be applied and the curing operation to be performed.

This improvement is available in curing sheets of india-rubber packing or similar material.

In order to keep the belts of the proper length while being cured, we pass such belts around rollers or bars P and P' and apply the necessary tension to draw the belt to the proper length. One section is cured while in this condition, then the belt is slackened and moved so as to bring other portions into position for curing, the tension is then reapplied, and the curing operation again brought into action. In all instances it is desirable to apply the sheet metal at the surfaces of the belts. A steam-table may be employed between the two thicknesses of the endless belt and plates of sheet metal may be introduced between the two or more thicknesses of belting, whether such belt be endless or whether two or more belts are operated upon at the same time.

Belts that are in lengths may be strained to the required tension during the curing operation.

We are aware that the hard compound of rubber has been pressed in molds or between metal plates, and also tin-foil or similar material, to prevent the hard rubber sticking to the mold. This, however, is not adapted to the curing of rubber belts under pressure, and has not been so used, and the heat employed was derived from an oven or vulcanizer, into which the mold was placed.

We claim as our invention—

1. The combination, with the hydraulic press and the platen and follower thereof, of two plates of sheet metal placed one at each side of the rubber belt or sheet and between the same and the head-block and follower, respectively, substantially as and for the purposes specified.

2. The method herein specified of curing or vulcanizing rubber belts, consisting in inclosing the same between plates of sheet metal at the opposite surfaces of the belt and bars at the edges of the belt, which retain the belt in a straight condition, and exposing the sheet metal and the belt to pressure and heat, substantially as set forth.

Signed by us this 16th day of January, A. D. 1884.

ROYAL M. BASSETT.
THOS. F. STEVENSON.

Witnesses:
JACOB RUSSELL,
W. H. LEMON.